US012804528B2

(12) United States Patent
Fu et al.

(10) Patent No.: US 12,804,528 B2
(45) Date of Patent: Nov. 17, 2026

(54) INFORMATION SENDING METHOD, INFORMATION RECEIVING METHOD, TERMINAL AND NETWORK DEVICE

(71) Applicant: GUANGDONG OPPO MOBILE TELECOMMUNICATIONS CORP., LTD., Dongguan (CN)

(72) Inventors: Zhe Fu, Dongguan (CN); Wenqiang Tian, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 747 days.

(21) Appl. No.: 17/980,127

(22) Filed: Nov. 3, 2022

(65) Prior Publication Data

US 2023/0058891 A1 Feb. 23, 2023

Related U.S. Application Data

(63) Continuation of application No. PCT/CN2020/089070, filed on May 7, 2020.

(51) Int. Cl.
*H04W 48/18* (2009.01)
*H04W 8/24* (2009.01)
(Continued)

(52) U.S. Cl.
CPC ............. *H04W 48/18* (2013.01); *H04W 8/24* (2013.01); *H04W 74/0833* (2013.01); *H04W 60/002* (2025.08); *H04W 74/0836* (2024.01)

(58) Field of Classification Search
CPC ... H04W 48/18; H04W 8/24; H04W 74/0833; H04W 74/0836; H04W 48/16
See application file for complete search history.

(56) References Cited

U.S. PATENT DOCUMENTS

| | | | | |
|---|---|---|---|---|
| 2017/0079059 A1* | 3/2017 | Li | ......................... | H04W 16/02 |
| 2018/0324663 A1* | 11/2018 | Park | ...................... | H04W 36/22 |

(Continued)

FOREIGN PATENT DOCUMENTS

| | | |
|---|---|---|
| CN | 106572516 A | 4/2017 |
| CN | 106572517 A | 4/2017 |

(Continued)

OTHER PUBLICATIONS

Nokia, Alcatel-Lucent Shanghai Bell, RACH isolation for Slices,R2-168258. 3GPP TSG-RAN WG2 Meeting #96 Reno, USA, Nov. 14-18, 2016. 3 pages.

(Continued)

*Primary Examiner* — Marcus Smith
(74) *Attorney, Agent, or Firm* — ASHURST PERKINS COIE US LLP

(57) ABSTRACT

Disclosed are an information sending method, an information receiving method, a terminal and a network device. The information sending method comprises: a terminal sending slicing information of the terminal to a network device. By means of the implementations of the present application, the technical problem of there not being a standard for RAN supporting network slicing in the relevant art is solved, such that the effect of adapting to the development of a technology standard can be achieved.

11 Claims, 3 Drawing Sheets

(51) Int. Cl.
*H04W 60/00* (2009.01)
*H04W 74/0833* (2024.01)
*H04W 74/0836* (2024.01)

(56) References Cited

U.S. PATENT DOCUMENTS

| | | | | |
|---|---|---|---|---|
| 2019/0174536 | A1 | 6/2019 | Han | |
| 2019/0230584 | A1* | 7/2019 | Lou | H04L 41/5051 |
| 2019/0261185 | A1* | 8/2019 | Velev | H04W 48/18 |
| 2019/0349774 | A1* | 11/2019 | Lou | H04W 16/10 |
| 2019/0364495 | A1* | 11/2019 | Mildh | H04W 74/0833 |
| 2020/0053083 | A1* | 2/2020 | Kunz | H04W 12/72 |
| 2020/0259786 | A1* | 8/2020 | Saarinen | H04L 63/0414 |
| 2022/0053579 | A1* | 2/2022 | Sivavakeesar | H04W 76/10 |
| 2022/0191935 | A1* | 6/2022 | Xiong | H04W 74/0836 |
| 2022/0338300 | A1* | 10/2022 | Sun | H04W 76/10 |
| 2022/0353908 | A1* | 11/2022 | Li | H04W 48/18 |
| 2022/0394604 | A1* | 12/2022 | Sun | H04W 48/16 |
| 2023/0017114 | A1* | 1/2023 | Wen | H04W 74/0833 |
| 2023/0029004 | A1* | 1/2023 | Gao | H04W 48/12 |
| 2023/0049532 | A1* | 2/2023 | Qu | H04W 48/16 |
| 2023/0156583 | A1* | 5/2023 | Murray | H04W 48/20 370/329 |

FOREIGN PATENT DOCUMENTS

| | | | |
|---|---|---|---|
| CN | 109792657 | A | 5/2019 |
| CN | 110741684 | A | 1/2020 |
| EP | 3537760 | A1 | 9/2019 |
| WO | 2019140629 | A1 | 7/2019 |

OTHER PUBLICATIONS

ZTE corporation, Sanechips, Signalling of slice information,R2-1802034. 3GPP TSG RAN WG2 Meeting #101 Athens, Greece, Feb. 26-Mar. 2, 2018. 6 pages.

Search Report of the EP application No. 20934788.9, issued on Apr. 11, 2023. 13 pages.

Examination Report for European Application No. 20934788.9 Issued Jun. 6, 2024, 8 Pages.

Nokia, Alcatel-Lucent Shanghai Bell, R2-167649 “RAN Slicing Overview”. 3GPP TSG-RAN WG2 Meeting #96. Reno, USA, Nov. 14-18, 2016. 3 pages.

First Office Action of the European application No. 20934788.9, issued on Dec. 14, 2023. 9 pages.

Written Opinion Mailed Jan. 27, 2021 In Application No. PCT/CN2020/089070.

International Search Report Mailed Jan. 27, 2021 In Application No. PCT/CN2020/089070.

Office Action dated Jan. 12, 2026 for Chinese Patent Application No. 2022115601087 and English translation, 18 pages.

Second office action of Chinese application No. 202211560108.7 issued on May 23, 2026, 17 pages with English translation.

* cited by examiner

INFORMATION SENDING METHOD, INFORMATION RECEIVING METHOD, TERMINAL AND NETWORK DEVICE

CROSS-REFERENCE TO RELATED APPLICATION

This application is a continuation application of International Application No. PCT/CN2020/089070, filed on May 7, 2020, the entire disclosure of which is hereby incorporated by reference.

TECHNICAL FIELD

The application relates to the communication field, in particular to an information sending and receiving method, a terminal and a network device.

BACKGROUND

The strong demand for wireless communications in vertical industries is obvious to all. In order to meet the needs of vertical industries in terms of delay, mobility, reliability and location accuracy, etc., Radio Access Network (RAN) needs to be enhanced on how to support vertical industries services in an access network. Based on network slicing, services with lower latency, more targeting, greater flexibility and higher scalability for multiple services with different requirements are provided. However, in related technologies, the behaviors related to network slicing supported by RAN are not involved.

Therefore, in related technologies, there is a lack of standards for RAN to support network slicing.

No effective solution to the above problem has been proposed at present yet.

SUMMARY

The implementation of the application provides a method for sending and receiving information, a terminal and a network device that solves the technical problem of lack of a standard for supporting network slicing in a RAN in the related technology, thereby achieving the effect of providing a standard for supporting network slicing in a RAN.

In a first aspect, an information transmission method is provided, including:

the terminal sends the slicing information of the terminal to the network device.

In a second aspect, an information receiving method is provided, including:

the network device receives the slicing information of the terminal sent by the terminal.

In a third aspect, a terminal is provided, including:

a first sending module, which is used for sending the slicing information of the terminal to the network device.

In a fourth aspect, a network device is provided, which includes:

a fourth receiving module, which is used for receiving the slicing information of the terminal sent by the terminal.

In a fifth aspect, a terminal is provided, including a processor and a memory. The memory is configured to store a computer program, and the processor is configured to call and run the computer program stored in the memory to perform the method in the first aspect or in various implementations thereof.

In a sixth aspect, a network device is provided, which includes a processor and a memory. The memory is configured to store a computer program, and the processor is configured to call and run the computer program stored in the memory to perform the method in the second aspect or various implementations thereof.

In a seventh aspect, a chip is provided for implementing the method according to any one of the first and second aspects or any of various implementation modes thereof. Specifically, the chip includes a processor configured to call and run a computer program from a memory to enable a device in which the chip is installed to perform the method according to any one of the first and second aspects or any of various implementation modes thereof.

In an eighth aspect, a storage medium is provided, which is configured to store a computer program that enables a computer to perform the method in any one of the first and second aspects or various implementations thereof.

In a ninth aspect, a computer program product is provided, which includes computer program instructions, the computer instructions enable a computer to perform the method according to any one of the first and second aspects or any of various implementation modes thereof.

In a tenth aspect, a computer program is provided, when the computer program is run on a computer, the computer program enables the computer to perform the method in any one of the first and second aspects or various implementations thereof.

With that above technical proposal, the terminal sends the slicing information of the terminal to the network device. The slicing information of the terminal is the slicing information of the slice required by the terminal. Therefore, the requirement of the terminal needing a network slicing is considered in the RAN, and the standard for supporting network slicing by the RAN is provided, which solves the technical problem of lack of the standard for supporting network slicing by the RAN in the related technology, and further can achieve the effect of adapting to the development of technical standards.

BRIEF DESCRIPTION OF DRAWINGS

Accompanying drawings described herein are intended to provide further understanding of the present application, and constitute a part of the present application. Exemplary implementations of the present application and descriptions thereof are intended to explain the present application, but do not constitute an inappropriate limitation to the present application. In the drawings.

DETAILED DESCRIPTION

Technical solutions in the implementations of the present application will be described below with reference to the accompanying drawings in the implementations of the present application. It is apparent that the implementations described are just a part of the implementations of the present application, rather than all of the implementations of the present application. Based on the implementations of the present application, all other implementations achieved by a person of ordinary skill in the art without making inventive efforts are within the protection scope of the present application.

The technical solutions in the implementations of the present application may be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, LTE Time Division Duplex (TDD), a Universal Mobile Telecommunications System (UMTS), a Worldwide Interoperability for Microwave Access (WiMAX) communication system, or a 5G system, etc.

Figure 1:
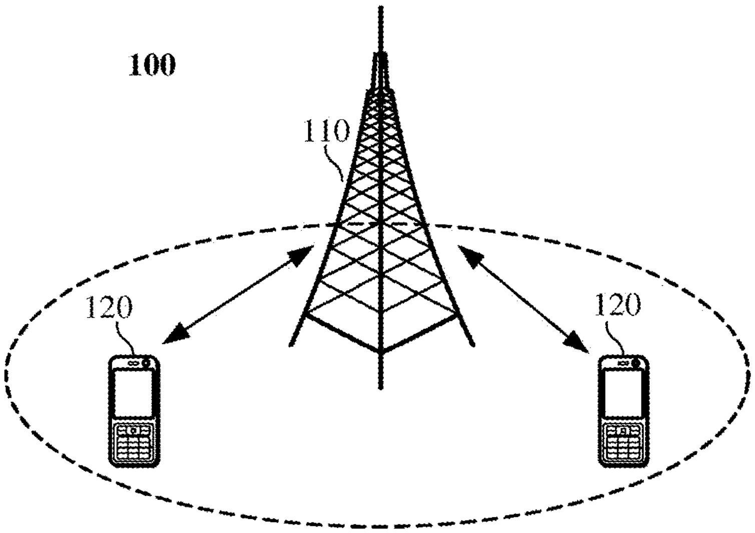
FIG. 1 is a schematic diagram of a communication system to which an implementation of the present application is applied.

Illustratively, a communication system 100 to which an implementation of the present application is applied is shown in FIG. 1. The communication system 100 may include a network device 110. The network device 110 may be a device that communicates with terminal devices 120 (or referred to as communication terminals, or terminals). The network device 110 may provide communication coverage for a specific geographical area, and may communicate with terminal devices located within the coverage area. Optionally, the network device 110 may be a Base Transceiver Station (BTS) in a GSM system or CDMA system, or a NodeB (NB) in a WCDMA system, or an Evolutional Node B (eNB or eNodeB) in an LTE system, or a radio controller in a Cloud Radio Access Network (CRAN); or the network device may be a mobile switching center, a relay station, an access point, a vehicle-mounted device, a wearable device, a hub, a switch, a bridge, a router, a network side device in a 5G network, or a network device in a future evolved Public Land Mobile Network (PLMN), etc.

The communication system 100 further includes at least one terminal device 120 located within the coverage range of the network device 110. The "terminal device" as used herein includes, but is not limited to, an apparatus configured to receive/send communication signals via a wired circuit, for example, via a Public Switched Telephone Network (PSTN), a Digital Subscriber Line (DSL), a digital cable, a direct cable; and/or another data connection/network; and/or via a wireless interface, for instance, for a cellular network, a Wireless Local Area Network (WLAN), a digital television network such as a Digital Video Broadcasting Handheld (DVB-H) network, a satellite network, and an Amplitude Modulation-Frequency Modulation (AM-FM) broadcast transmitter; and/or another terminal device; and/or an Internet of Things (IoT) device. A terminal device configured to communicate via a wireless interface may be referred to as a "wireless communication terminal", a "wireless terminal" or a "mobile terminal". Examples of the mobile terminal include, but are not limited to, a satellite or cellular phone; a Personal Communications System (PCS) terminal capable of combining a cellular radio phone with data processing, facsimile, and data communication capabilities; a Personal Digital Assistant (PDA) that may include a radio phone, a pager, internet/intranet access, a Web browser, a memo pad, a calendar, a Global Positioning System (GPS) receiver; and a conventional laptop and/or palmtop receiver or another electronic apparatus including a radio phone transceiver. The terminal device may refer to an access terminal, User Equipment (UE), a subscriber unit, a subscriber station, a mobile station, a rover station, a remote station, a remote terminal, a mobile device, a user terminal, a terminal, a wireless communication device, a user agent, or a user device. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or another processing device connected to a wireless modem, a vehicle-mounted device, a wearable device, a terminal device in a 5G network, or a terminal device in a future evolved PLMN, or the like.

Optionally, Device to Device (D2D) communication may be performed between the terminal devices 120.

Optionally, the 5G system or 5G network may also be referred to as a New Radio (NR) system or an NR network.

FIG. 1 illustrates one network device and two terminal devices. Optionally, the communication system 100 may include multiple network devices, and other quantity of terminal devices may be included within the coverage area of each network device, which is not limited in the implementations of the present application.

Optionally, the communication system 100 may also include another network entity, such as a network controller, a mobile management entity, etc., which is not limited in the implementations of the present application.

It should be understood that a device with a communication function in a network/system in the implementations of the present application may also be referred to as a communication device. Taking the communication system 100 shown in FIG. 1 as an example, communication devices may include a network device 110 and terminal devices 120 which have communication functions, and the network device 110 and the terminal devices 120 may be the specific devices described above, and will not be described repeatedly herein. The communication devices may also include other devices in the communication system 100, for example other network entities, such as network controllers and mobile management entities, which is not limited in the implementations of the present application.

It should be understood that the terms "system" and "network" are often used interchangeably herein. The term "and/or" herein refers to an association relationship describing associated objects only, which indicates that three kinds of relationships may exist, for example, A and/or B may indicate three cases: A alone, both A and B at the same time, and B alone. In addition, the symbol "/" herein generally indicates that objects before and after the symbol "/" have an "or" relationship.

Figure 2:
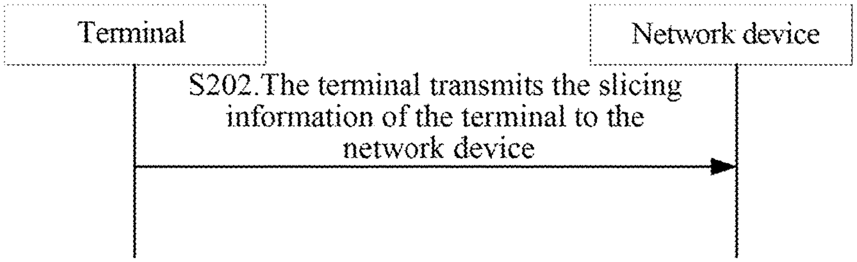
FIG. 2 is a schematic flow chart of a information transmission method according to an implementation of the present application.

Based on the above description, the implementation of the present application provides an information transmission method. FIG. 2 is a schematic flow chart of a information transmission method according to an implementation of the present application. As shown in FIG. 2, the method includes the following acts.

S202, the terminal sends the slicing information of the terminal to the network device, wherein the slicing information of the terminal may be the slicing information required by the terminal.

Through the above acts, the terminal sends the slicing information of the terminal to the network device, and the slicing information of the terminal is the slicing information required by the terminal. The standard for supporting network slicing by the RAN is provided, which solves the technical problem of lack of the standard for supporting network slicing by the RAN in the related technology, and further can achieve the effect of adapting to the development of technical standards.

It should be noted that the terminals in the method may be intelligent terminals, for example, some intelligent terminals such as smart phones, smart cars, unmanned aerial vehicles, robots, etc. It may also be some wearable devices, such as smart watches, smart bracelets, smart glasses, etc.

As an implementation, when the terminal sends the slicing information of the terminal to the network device, the terminal can send the slicing information of the terminal to the network device in a variety of ways, for example, the terminal can carry the slicing information to the network device through a Radio Resource Control (RRC) message or an uplink message in a random access RACH process. The RRC message may be an uplink dedicated RRC message (UL dedicated RRC message).

As an implementation, in principle, the slicing information of the terminal is sent by the terminal to the network device, and any uplink message sent by the terminal to the network device may be used to carry the slicing information of the terminal, for example, the uplink message in the random access RACH process may be used. To better explain the uplink message in the random access RACH process, in this implementation, the random access RACH process is explained first.

In NR, there are two kinds of RACH processes, one is legacy) random access (4-step RACH), and the other is two-step random access process (2-step RACH), which are described below.

Legacy Random Access (4-step RACH):

In the RACH process, the trigger/set-up cause value is carried in Msg 3.

The random access process is mainly triggered by the following events:

Initial access from RRC IDLE;

RRC Connection Re-establishment procedure;

Handover;

DL or UL data arrival during RRC CONNECTED when UL synchronization status is "non-synchronized";

UL data arrival during RRC CONNECTED when there are no PUCCH resources for SR available;

SR failure;

Request by RRC upon synchronous reconfiguration;

Transition from RRC INACTIVE;

To establish time alignment at SCell addition;

Request for Other SI (see subclaim 7.3);

Beam failure recovery.

In NR, two kinds of random access are mainly supported, one is based on contention and the other is based on non-contention.

The steps are as follows:

Step1: The terminal selects preamble and Physical Random Access Channel (PRACH) resources (time-frequency resources and code domain resources).

The terminal sends the selected preamble on the selected PRACH time-frequency resource. Based on the preamble, the base station can estimate the uplink timing and the size of the grant resource required by the terminal to send the message 3 (probably known, but not accurately known).

Step2: The network sends RAR to the terminal.

After the terminal sends the message 1 (Msg1), a RAR window is turned on and the Physical Downlink Control Channel (PDCCH) in the window is monitored. The PDCCH is scrambled by using a Random Access Radio Network Temporary Identifier (RA-RNTI for short).

After successfully monitoring the PDCCH scrambled by RA-RNTI, the terminal can obtain the Physical Downlink Shared Channel (PDSCH for short) scheduled by the PDCCH, which includes Random Access Response (RAR).

The subheader of RAR contains BI, which indicates the fallback time of retransmission message 1;

RAPID in RAR: the preamble index received by the network response;

the payload of RAR contains a TAG for adjusting the uplink timing;

UL grant: uplink resource indication for scheduling MSG3; and temporary C-RNTI (Temporary cell wireless network temporary identifier): PDCCH (Initial Access) for scrambling Message 4.

Step3: terminal sends RRC messages on scheduled resources

The message Msg3 is mainly used to inform the network what event triggers the RACH process. For example, if it is an initial access random process, Msg3 will carry the terminal identifier and establishment cause; if it is RRC reestablishment, it will carry the connected state terminal identifier and the re-establishment cause (re-establishment cause);

at the same time, the competitive conflict of terminal identifier carried by Msg3 may be solved in the fourth step.

Step4: contention conflict resolution

Msg4 is used for conflict resolution.

Figure 3:
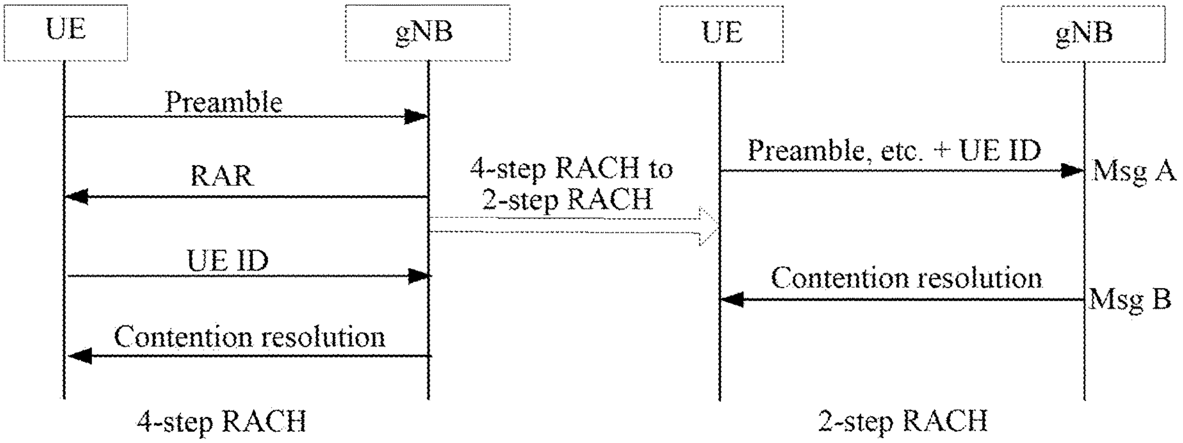
FIG. 3 is a schematic diagram of a two-step random access procedure according to an implementation of the present application.

Two-Step Random Access Process (2-Step RACH):

Two-step RACH can improve the delay and reduce the signaling overhead. FIG. 3 is a schematic diagram of a two-step random access procedure according to an implementation of the present application. As shown in FIG. 3, the basic mode is that Msg A sends Msg1+Msg3 of the four-step RACH, and Msg B sends Msg2+Msg4 of the four-step RACH.

Similarly, in the 2-step RACH process, the trigger/build cause value is carried in Msg A.

Based on the above description, as one implementation, the uplink message may include at least one of: message 1 in the four-step RACH process, message 3 in the four-step RACH process, and message A in the two-step RACH process. That is, at least one of the three uplink messages carries the slicing information of the terminal and sends the slicing information of the terminal to the network device.

As one implementation, the slicing information is carried by a cause value in the RRC message or in the uplink message, wherein the cause value in the RRC message is used to represent a cause for triggering the RRC message by a standard, and the cause value in the uplink message is used to represent a cause for triggering the RACH process. Wherein, the content of the cause value in the RRC message includes the slicing information, or the content of the cause value in the uplink message includes the slicing information.

As one implementation, the slicing information of the terminal may include a variety of network slicing that may be used by the network device to determine the requirements of the terminal. For example, it may include at least one of: a slicing identity of the terminal, a type to which a slice of the terminal belongs, a priority of the slice of the terminal, a priority of the type to which a slice of the terminal belongs, location information of the terminal, and a preferred Public Land Mobile Network (PLMN) identifier.

The slicing identity of the terminal is used for identifying the slice of the terminal, that is, used for identifying the slice required by the terminal. The slicing identity may be in many forms, for example, simple digital identifier, letter identifier, text identifier, etc., and some complex characters can also be used. The type to which the slice of the terminals belong may be based on different applications, or may be based on different specific networks, etc. The priority of the slice of the terminal may be the level of the slice that is used preferentially, for example, the higher the level is, the more preferable the slice may be used. The priority of the type to which the slice of the terminal belongs may be the level of the slicing type that is used preferentially, for example, the higher the level is, the more preferable the slice may be used.

As an implementation, before the terminal sends the slicing information of the terminal to the network device, the terminal receives the indication information sent by the network device, the indication information is used to indicate whether the terminal is allowed to execute different operations based on the slicing information or whether the terminal is allowed to report the slicing information.

As an implementation, before the terminal sends the slicing information of the terminal to the network device, it further includes: the terminal receives the slicing indication information sent by the network device; the terminal determines slicing information according to the slicing indication information.

It should be noted that the slicing indication information may be related information for the network device to indicate, to the terminal, a slice that the network device can be supported.

As one implementation, the slicing indication information may include a variety of, for example, it may include at least one of following: a slicing identity supported by network device, a slicing type supported by network device, a mapping relationship between the slicing identity and slicing type supported by network device, a priority of slicing identity supported by network device, a priority of the slicing type supported by network device, an indication that the network device allows the slicing information to be reported, a Public Land Mobile Network (PLMN) identifier supported by network device, a mapping relationship between the slicing identity and PLMN identifier supported by network device, a mapping relationship between the slicing type and PLMN identifier supported by network device, a threshold for the quantity of terminals defined by a slice supported by a network device, a threshold for the quantity of terminals defined by the slice supported by a PLMN, a threshold for the quantity of terminals defined by the slice supported by a session, a threshold for the quantity of sessions defined by the slice supported by a network device, and a threshold for the quantity of sessions defined by the slice supported by a PLMN.

The contents of the slicing instruction information corresponding to the slicing information of the terminal may have the same meaning as the slicing information of the terminal. In addition, the slicing identity supported by the network device, the slicing type supported by the network device, the priority of the slicing identity supported by the network device, the priority of the slicing type supported by the network device, and the Public Land Mobile Network (PLMN) identifier supported by the network device may be one or plural, for example, may be a list including multiple.

As an implementation, when the terminal receives the slicing indication information sent by the network device, it can adopt multiple ways, for example, the terminal receives the slicing indication information sent by the network device through at least one of the following ways: the terminal receives the slicing indication information through the way of receiving the broadcast of the network device; the terminal receives the slicing indication information by receiving a predetermined signaling sent by the network device. It should be noted that the broadcast range of the network device can cover the terminal by setting the broadcast range in the broadcast mode. When the predetermined signaling is adopted in the above manner, the predetermined signaling may be various, for example, it may be dedicated RRC signaling, for example, RRCrelease signaling.

As an implementation, when the terminal determines the slicing information based on the slicing indication information, the slicing information is determined to be different depending on the different contents of the slicing information, for example, the slicing information may include at least one of the following:

- the terminal determines the type to which the slice of the terminal belongs according to the mapping relationship between the slicing identity supported by the network device and the slicing type in the slicing indication information; that is, if the slice of the terminal belongs to the slicing type indicated in the slicing indication information, the type to which the slice of the terminal belongs may be determined according to the mapping relationship between the slicing identity and the slicing type.

If the terminal determines that the slice of the terminal does not belong to the slicing type indicated in the slicing indication information, the terminal assigns the slice of the terminal to a default type or a predetermined type; wherein the default type and the predetermined type may be set in advance.

If the terminal determines that the slice of the terminal does not belong to the slicing indicated in the slicing indication information, the terminal assigns the slice of the terminal to a default type or a predetermined type; that is, the slice of the terminal may be categorized into one type regardless of whether the slice of the terminal do not belong to the slicing type indicated in the slicing instruction information or the slice of the terminal do not belong to the slice indicated in the slicing instruction information.

If the terminal determines that the slice of the terminal does not belong to the slicing indicated in the slicing indication information, the terminal assigns the slice of the terminal to a default slice or a non-slice. That is, even if the slice of the terminal does not belong to the slicing indicated in the slicing indication information, the slice of the terminal may be attributed to one slicing or a non-slice.

The terminal determines the type to which the slice of the terminal belongs according to the mapping relationship between all slicing identities of the network device and the slicing type in the slicing indication information. That is, the network device sends the relevant information of all the slices of the network device to the terminal, and the terminal determines the type of the slice of the terminal according to the mapping relationship between all the slicing identities and the slicing types. The network device provided herein sending all the slicing-related information also belongs to a mode, as opposed to the above-mentioned network device sending only the supported slicing-related information.

As one implementation, the slicing identity of the terminal or the slicing identity supported by the network device may include a plurality, for example, each may include at least one of the following: network slicing selection assistance information, single network slicing selection assistance information, and network slicing identity.

As one implementation, a slice of a terminal (i.e. a slice required by the terminal) may include at least one of the following: a requested slice, an allowed slice, a configured slice, a default slice, and a contracted slice.

As an implementation, after the terminal sends the slicing information of the terminal to the network device, it may also include at least one of the following.

The terminal receives the control result sent by the network device, wherein the control result includes: the result of the RACH process determined according to the slicing information, or the response to the RACH process triggered by the terminal;

The terminal receives the selection result sent by the network device, wherein the selection result includes at least one of the following: an access and mobility management function AMF for serving the terminal selected according to the slice information, a session management function SMF for serving the terminal selected according to the slicing information, a user plane function UPF for serving the terminal selected according to the slicing information, and an indication of whether a required core network entity is selected.

The results of RACH process can include: RACH process success and RACH process failure. The response to the terminal-triggered RACH process may include at least one of: the network device responds to the UE (causing the UE RACH to succeed), the network device sends a RACH response message for the UE (causing the UE RACH to succeed), the network device sends a short RACH backoff (causing the RACH to succeed as soon as possible), the network device does not respond to the UE, the network device does not send Msg 4 or Msg B for the UE, and the network device sends a long RACH backoff.

Figure 4:
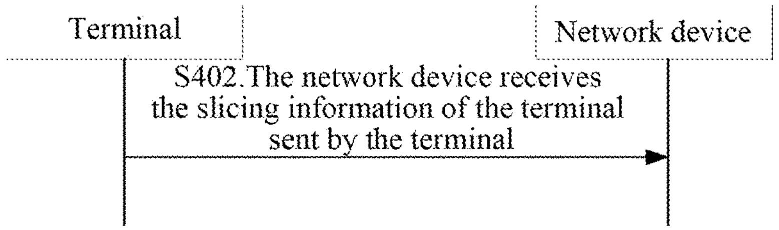
FIG. 4 is a schematic flow chart of a information receiving method according to an implementation of the present application.

The implementation of the application further provides an information receiving method. FIG. 4 is a schematic flow chart of a information receiving method according to an implementation of the present application. As shown in FIG. 4, the method includes the following acts.

S402, the network device receives the slicing information of the terminal sent by the terminal.

Through the above act, the network device receives the slicing information of the terminal sent by the terminal. The slicing information of the terminal is the slicing information of the slice required by the terminal. Therefore, the requirement of the terminal needing a network slicing is considered in the RAN, and the standard for supporting network slicing by the RAN is provided, which solves the technical problem of lack of the standard for supporting network slicing by the RAN in the related technology, and further can achieve the effect of adapting to the development of technical standards.

It should be noted that the network device in the method may be a device in an access network, for example, various types of base stations. The access network may be a Radio Access Network (RAN) or the like.

As an implementation, when the network device receives the slicing information sent by the terminal, the network device can receive the slicing information of the terminal sent by the terminal in a variety of ways, for example, the network device can carry the slicing information and receive the slicing information sent by the terminal through a Radio Resource Control (RRC) message or an uplink message in a random access RACH process. The RRC message may be an uplink dedicated RRC message (UL dedicated RRC message).

As an implementation, in principle, the slicing information of the terminal is sent by the terminal to the network device, and any uplink message sent by the terminal to the network device may be used to carry the slicing information of the terminal, for example, the uplink message in the random access RACH process may be used. Based on the above description of the RACH process, the uplink message in the RACH process may include at least one of the following: message 1 in the four-step RACH process, message 3 in the four-step RACH process, and message A in the two-step RACH process. Therefore, the network device can receive the slicing information of the terminal through at least one of the above three messages.

As one implementation, the slicing information is carried by a cause value in the RRC message or in the uplink message, wherein the cause value in the RRC message is used to represent a cause for triggering the RRC message by a standard, and the cause value in the uplink message is used to represent a cause for triggering the RACH process. Wherein, the content of the cause value in the RRC message includes the slicing information, or the content of the cause value in the uplink message includes the slicing information.

As one implementation, the slicing information of the terminal may include a variety of network slicing that may be used by the network device to determine the requirements of the terminal. For example, it may include at least one of: a slicing identity of the terminal, a type to which the slice of the terminal belongs, a priority of the slice of the terminal, a priority of the type to which the slice of the terminal belongs, location information of the terminal, and a preferred Public Land Mobile Network (PLMN) identifier.

Similarly, corresponding to the terminal side, the slicing identity of the terminal is used for identifying the slice of the terminal, that is, used for identifying the slice required by the terminal. The slicing identity may be in many forms, for example, simple digital identifier, letter identifier, text identifier, etc., and some complex characters can also be used. The type to which the slice of the terminals belong may be based on different applications, or may be based on different specific networks, etc. The priority of the slice of the terminal may be the level of the slice that is used preferentially, for example, the higher the level is, the more preferable the slice may be used. The priority level of the type to which the slice of the terminal belongs may be the level of the slicing type that is used preferentially, for example, the higher the level is, the more preferable the slice may be used.

As an implementation, before the network device receives the slicing information of the terminal sent by the terminal, it further includes the following acts: the network device sends the slicing indication information to the terminal. The slicing indication information may be related information for the network device to indicate, to the terminal, a slice that the network device can support.

As an implementation, before the network device receives the slicing information of the terminal sent by the terminal, the method further includes: sending the known slicing information to the terminal. The slicing information may be related information for the network device to indicate to the terminal slices known to the network device, such as priority, and the relationship between slices and types, etc.

As one implementation, the slicing indication information may also include a variety of, for example, it may include at least one of the following: a slicing identity supported by network device, a slicing type supported by network device, a mapping relationship between the slicing identity and slicing type supported by network device, a priority of slicing identity supported by network device, priority of slicing type supported by network device, an indication that the network device allows the slicing information to be reported, Public Land Mobile Network (PLMN) identifier supported by network device, a mapping relationship between the slicing identity and PLMN identifier supported by network device, a mapping relationship between slicing type and PLMN identifier supported by network devices, a threshold for the quantity of terminals defined by a slice supported by a network device, a threshold for the quantity of terminals defined by the slice supported by a PLMN, a threshold for the quantity of terminals defined by the slice supported by a session, a threshold for the quantity of sessions defined by the slice supported by a network device, and a threshold for the quantity of sessions defined by the slice supported by a PLMN.

Corresponding to the terminal side, the contents of the slicing instruction information corresponding to the slicing information of the terminal may have the same meaning as the slicing information of the terminal. In addition, the slicing identity supported by the network device, the slicing type supported by the network device, the priority of the slicing identity supported by the network device, the priority of the slicing type supported by the network device, and the Public Land Mobile Network (PLMN) identifier supported by the network device may be one or plural, for example, may be a list including multiple objects.

As an implementation, when the network device sends the slicing indication information to the terminal, it can also adopt multiple modes, for example, the network device sends the slicing indication information to the terminal through at least one of the following modes: the network device sends the slicing indication information to the terminal through a broadcast mode; the network device sends slicing indication information to the terminal by sending predetermined signaling to the terminal. Correspondingly, the broadcast range of the network device can cover the terminal by setting the broadcast range in the broadcast mode. When the predetermined signaling is adopted in the above manner, the predetermined signaling may be various, for example, it may be dedicated RRC signaling, for example, RRCrelease signaling.

As one implementation, the slicing identity of the terminal or the slicing identity supported by the network device may include a plurality, for example, each may include at least one of the following: network slicing selection assistance information, single network slicing selection assistance information, and network slicing identity.

As an implementation, after the network device receives the slicing information of the terminal sent by the terminal, the network device can also determine whether the slice required by the terminal can be provided for the terminal according to the slicing information, and obtain a judgment result. That is, the network device determines whether a slice required by the terminal can be provided for the terminal, or whether a slice of the terminal can be provided for the terminal so as to subsequently provide services to the terminal.

As an implementation, after the network device determines whether the slice required by the terminal can be provided for the terminal, the judgment result of whether the slice required by the terminal can be provided for the terminal can also be sent to the terminal, that is, the network device sends the judgment result to the terminal. By sending the judgment result to the terminal, the terminal is made aware of whether the network device can provide the terminal with a slice required by the terminal, so that the terminal correspondingly executes the behavior adapted to the network device.

As an implementation, when a network device sends a judgment result to a terminal, different processing may be performed according to different judgment results. For example, when the judgment result is that a slice of the terminal can be provided to the terminal, the network device sends to the terminal a response message including a slice of the terminal that can be provided to the terminal. That is, when the network device determines that the slicing information of the terminal can be provided to the terminal, the slicing information of the terminal is sent to the terminal device. Otherwise, the slicing information of the terminal is not sent.

As an implementation, the network device determines whether the slice required by the terminal can be provided for the terminal according to the slicing information in the following manner: when the network device determines that the terminal meets the slicing condition according to the slicing information, the network device determines that the slice required by the terminal can be provided for the terminal.

As one implementation, slicing conditions are different according to different slicing information, for example, it may include at least one of the following: the slice supported by the network device matches the slice required by the terminal, the slicing type supported by the network device matches the type to which the slice required by the terminal belongs, the location of the terminal is within the range of the slicing service provided by the network device, the priority of the slice supported by the network device meets the priority of the slice required by the terminal, the slice with a predetermined priority supported by the network device matches the slice required by the terminal, the slice supported by the network device matches the slice with a predetermined priority required by the terminal, a slice with predetermined priority supported by the network device matches a slice with predetermined priority required by the terminal, a type to which a slice with a predetermined priority supported by the network device belongs matches a type to which a slice required by the terminal belongs, the type to which the slice supported by the network device belong matches the type to which the slice with the predetermined priority required by the terminal belong, the type to which the slice with predetermined priority supported by the network device belongs matches the type to which the slice with predetermined priority required by the terminal belongs, the slicing type supported by the network device meets the type to which the slice required by the terminal belongs, lower than the threshold of the quantity of terminals defined by the slices supported by the network device, lower than the threshold for the quantity of terminals defined by the slice supported by a PLMN, lower than the threshold for the quantity of terminals defined by the slice supported by a session, lower than the threshold for the quantity of sessions defined by the slice supported by a network device, and lower than the threshold for the quantity of sessions defined by the slice supported by a PLMN; the slice required by the terminal matches the predetermined slice supported by the network device, and the predetermined slice required by the terminal matches the slice supported by the network device.

Where, for slicing conditions: lower than the threshold of the quantity of terminals defined by the slices supported by the network device, lower than the threshold for the quantity of terminals defined by the slice supported by a PLMN, lower than the threshold for the quantity of terminals defined by the slice supported by a session, lower than the threshold for the quantity of sessions defined by the slice supported by a network device, and lower than the threshold for the quantity of sessions defined by the slice supported by a PLMN. Lower than the threshold of the quantity of terminals defined by the slices supported by the network device may be that the maximum quantity of terminals or PDU (Protocol Data Unit) sessions or DRB (Data Radio Bearer) that may be served by slices supported by network device. Taking the threshold of the quantity of terminals as an example, for slices supported by network device, it can provide services for at most 3 terminals, where 3 is the threshold of the quantity of terminals. It should be noted that 3 is merely an example and may be another number depending on the specific case of the slicing.

For slicing conditions: the network device selects a slice required by the terminal that is more compatible with the slice supported by the network device. For example, the network device indicates that the slicing identified as 1-5 is supported, the slicing identified as 1-3 is required by the terminal 1, the slicing identified as 1-4 is required by the terminal 2, and the network device selects the terminal 2. For another example, the network device indicates that slices with slicing identities 1-5 are supported, the priority of slicing identities 1 to 5 is getting lower and lower. Terminal 1 requires slicing identities 1-3, terminal 2 requires slicing identities 2-5, and the network device selects terminal 1.

Based on the above slicing conditions, in view of the above situation that the quantity of terminals is less than the threshold defined by the slices supported by the network device, the network device determines whether the required slicing can be provided to the terminal in a case that is less than a threshold of the quantity of terminals defined by the slice supported by the network device and greater than another threshold of the quantity of terminals defined by the slice supported by the network device.

It should be noted that the above examples of slicing identity are also applicable to the judgment of slicing type, the judgment of the priority of slicing identity, the judgment of the priority of slicing type, etc., and will not be given here.

In addition, for the slicing condition: the slice required by the terminal matches the predetermined slice supported by the network device, for example, the slices required by the terminal may be plural. For example, the identities of the slices required by the terminal are 1, 3, 5, and the identities of the predetermined slice supported by the network device are 1, 3, 5, 8, the slice required by the terminal may be considered to match the predetermined slice supported by the network device. However, if the identifiers of the predetermined slices supported by the network device are 1, 3, 7, 9, the slices required by the terminal may be considered to be mismatched with the predetermined slices supported by the network device. In another case, the slice required by the terminal need to be able to provide services for a predetermined quantity of terminals. If the predetermined slice supported by the network device can further provide services for a predetermined number of terminals, the slice required by the terminal is considered to match the predetermined slice supported by the network device, otherwise the slice required by the terminal is considered to mismatch the predetermined slice supported by the network device. For example, the slice required by the terminal needs to be able to provide services for more than three terminals. If the predetermined slice supported by the network device can further provide services for more than three terminals, the slice required by the terminal is considered to match the predetermined slice supported by the network device, but if the predetermined slice supported by the network device cannot serve more than three terminals, the slice required by the terminal is considered to mismatch the predetermined slice supported by the network device.

As an implementation, the network device determines whether the slice required by the terminal can be provided for the terminal according to the slicing information, and obtains a judgment result, including at least one of the following:

- the network device executes RACH process control on the terminal according to whether the slice required by the terminal can be provided for the terminal or not, and obtaining a control result, wherein, the control result includes: a result of the RACH process determined according to the slicing information, or a response to the RACH process triggered by the terminal;
- the network device feeds back the control result to the terminal according to whether it can provide the slice required by the terminal, wherein the control result includes: the result of the RACH process determined according to the slicing information, or the response to the RACH process triggered by the terminal;
- the network device responds to the RRC request message triggered by the terminal according to whether the slice required by the terminal can be provided for the terminal;
- The network device selects at least one of the following to provide services for the terminal according to whether it can provide the terminal with the slice required by the terminal: an access and mobility management function AMF, a session management function SMF, and a user plane function UPF.

The results of RACH process may include: RACH process execution success and RACH process execution failure. The response to the terminal-triggered RACH process may include at least one of: the network device responds to the UE (causing the UE RACH to succeed), the network device sends a RACH response message for the UE (causing the UE RACH to succeed), the network device sends a short RACH backoff (causing the RACH to succeed as soon as possible), the network device does not respond to the UE, the network device does not send Msg 4 or Msg B for the UE, and the network device sends a long RACH backoff.

As one implementation, a slice of a terminal (i.e. a slice required by the terminal) may include at least one of the following: a requested slice, an allowed slice, a configured slice, a default slice, and a contracted slice.

In connection with the above-mentioned implementations and the preferred implementation, the preferred implementation provided by the present application will be described below, taking the terminal as a UE as an example.

In the related technology, how to enable the UE to quickly access the required network slicing cell is not considered. In the preferred implementation of the invention, a random access method based on slicing is provided. For example, the UE (described by taking the UE as an example below) carries slicing information in the RACH process, so that the UE can quickly access and avoid the delay of UE access and business service.

The slicing-based random access method may include: The UE carries slicing information in the RACH process. The slicing information is used for the network device to perform access control (e.g. to determine the result of performing the RACH process) and/or to select an appropriate network functional entity, e.g. the appropriate network functional entity includes at least one of the following: an Access and Mobility Management Entity (AMF), a Session Management Entity (SMF), a User Plane Function (UPF), and the like.

The slicing information of the UE includes at least one of the following: a slicing identity of the UE, a type to which the slice of the UE belongs, a priority of the slice of the UE, a priority of the type to which the slice of the UE belongs, location information of the UE, and a preferred Public Land Mobile Network (PLMN) identifier.

Alternatively, before the UE sends the slicing information to the network device, the network device sends the slicing indication information to the UE through broadcasting or through the dedicated Radio Resource Control (RRC) message, and the slicing indication information includes at least one of the following: slicing type supported by network devices, a slicing identity supported by network devices, mapping relationship between the slicing identity and slicing type supported by network devices, priority of slicing type supported by network devices, priority of slicing identity supported by network devices, an indication that the network device allows the slicing information to be reported, Public Land Mobile Network (PLMN) identifier supported by network device, a mapping relationship between the slicing identity and PLMN identifier supported by network device, mapping relationship between slicing type and PLMN identifiers supported by network devices, a threshold for the quantity of terminals defined by a slice supported by a network device, a threshold for the quantity of terminals defined by the slice supported by a PLMN, a threshold for the quantity of terminals defined by the slice supported by a session, a threshold for the quantity of sessions defined by the slice supported by a network device, and a threshold for the quantity of sessions defined by the slice supported by a PLMN.

In addition, before the UE sends the slicing information of the terminal to the network device, the UE may determine the slicing information based on the slice required by the UE and the slicing indication information sent by the network device.

It should be noted that both the slicing identity in the slicing information and the slicing identity in the slicing indication information may include at least one of the following: Network Slice Selection Assistance Information (NSSAI), Network Slice Selection Assistance Information (SNSSAI), Single Network Slice Selection Assistance Information (NSID).

The detailed RACH process is taken as an example to explain the implementation.

Implementation 1

Figure 5:
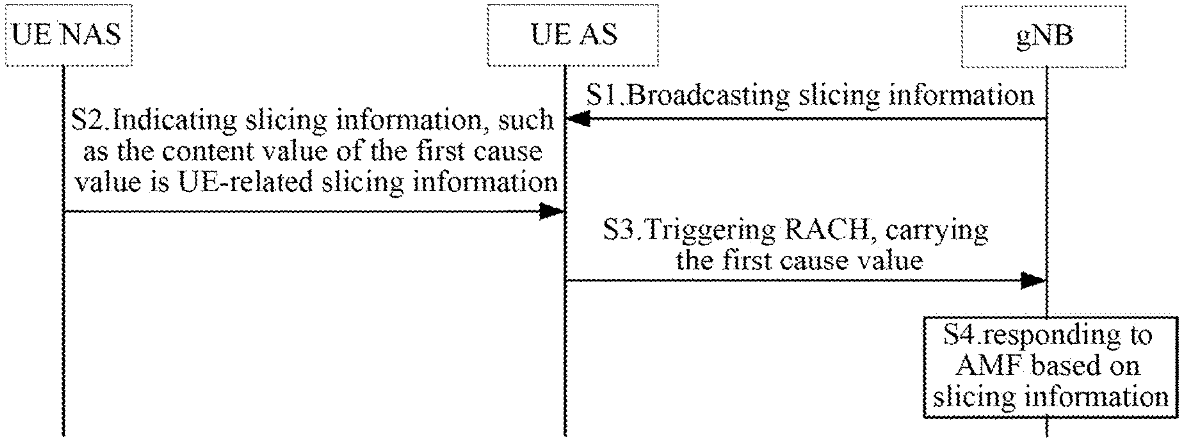
FIG. 5 is a schematic diagram of Implementation 1 according to an implementation of the present application.

The UE carries the slicing information through the RACH process. For example, Msg 3 or Msg A message in the RACH process may be used for carrying. For example, slicing information may be indicated using a first cause value carried in the RACH process. The slicing information is used by the network device to perform access control (e.g. to determine the RACH response mode or result). The slicing information may include at least one of the following: a slicing identity of the UE, a type to which the slice of the UE belongs, a priority of the slice of the UE, a priority of the type to which the slice of the UE belongs, and location information of the UE. FIG. 5 is a schematic diagram of Implementation 1 according to an implementation of the present application. As shown in FIG. 5, the implementation includes:

S1, the network device broadcasts the slicing related information through the serving cell.

The broadcast slicing-related information may include at least one of the following: slicing identity (specifically, the slicing identity may include: NSSAI, S-NSSAI, NSID); slice type (including type identifier); mapping relationship between slicing identity and slicing type; priority of slicing type; priority of slicing identity.

The slicing-related information may include slices supported by the serving cell or slices not supported by the serving cell. Among them, the slice supported by the serving cell is the slice supported by the network, that is, the slice supported by the network device included in the network.

Slicing-related information can also be indicated by dedicated RRC signaling, such as RRCrelease.

S2, the Non-Access Stratum (NAS) of the UE sends indication information to the Access Stratum (AS) of the UE, and the indication information is the slicing information related to the UE.

The indication information is embodied as the first cause value.

The content of the cause value is slicing information.

The slicing information may include at least one of the following: a slicing identity of the UE, a type to which the slice of the UE belongs, a priority of the slice of the UE, a priority of the type to which the slice of the UE belongs, and a location information of the UE.

S3, the UE AS triggers the RACH process and carries the slicing information related to the UE in the RACH process.

The RACH process is 2-step RACH, 4-step RACH.

The slicing information is carried in Msg 3 or Msg A.

The slicing information is carried using the first cause value in the RACH.

The slicing information, for example, the cause value, is carried in the establishment request message, or the reestablishment request message, or the resume request message.

The cause value is the new cause value introduced in the establishmentCause, reestablishmentCause, or ResumeCause, and is used to reflect the slicing information.

The content of cause value is the slicing information.

The slicing information may include at least one of the following: a slicing identity of the UE, a type to which the slice of the UE belongs, a priority of the slice of the UE, a priority of the type to which the slice of the UE belongs, a location information of the UE, and a slicing request indication. Slicing information, which may be one or more, for example, a list.

The slice of the UE in the slicing information may include one of the following: a requested slice, an allowed slice, a configured slice, and a contracted slice, i.e. the slicing information may be embodied as a slicing identity.

In addition:

when the UE determines the slicing type to which the slice of the UE belongs, it may be determined according to the relationship between the slicing and the type indicated by the cell. If the slice of the UE does not belong to the slicing in the type indicated by the cell, the UE can assign the slicing to the default type or a predetermined type.

When the UE determines that the slice of the UE does not belong to the slicing indicated by the cell, the UE can assign the slicing to the default type or a predetermined type, and can also directly report the slicing identity.

When the UE determines that the slice of the UE does not belong to the slicing indicated by the cell, the UE may assign the slicing to the default slice or a non-slice.

In addition, the network may also give all slicing information and/or relationships between all slicing information and types, and the slicing is not necessarily the slice supported by the current network.

S4, the network device receives the first cause value carried in the RACH, determines the slicing information, and further executes the access control (such as whether to respond to the RACH process of the UE, whether to send Msg 4 or Msg B for the UE, whether to send long/short RACH backoff value, etc.). Here is an example.

If the cause value is the UE location, the network device determines a slice that can be provided according to the UE location. That is, according to the location of the UE, the network device determines the slice of the location and determines whether the slicing service can be provided for the UE. Alternatively, the network device determines the slice of the location according to the location of the UE and the slicing priority, or the location of the UE and the slicing requirement, and determines whether the preferable slicing service can be provided for the UE. If the location has a corresponding slicing service, the network device responds to the UE, or sends a RACH response message for the UE, or sends a short RACH backoff. Otherwise, the network device does not respond to the UE, or does not send Msg 4 or Msg B for the UE, or sends a long RACH backoff.

If the cause value is the UE location and slicing request indication (or other slicing information of the UE, etc.), the network device determines that the corresponding slice required by the UE can be provided for the UE according to the information, and the network device responds to the UE (making the UE RACH successful), or sends a RACH response message for the UE (making the UE RACH successful), or sends a short RACH backoff (making the RACH successful as soon as possible). Otherwise, the network does not respond to the UE, or does not send Msg 4 or Msg B for the UE, or sends a long RACH backoff.

If the cause value is the slicing identity of the UE or the type to which the slice of the UE belongs, the network device determines that the service corresponding to the slicing can be provided for the UE according to the information, and the network device responds to the UE (making the UE RACH successful), or sends a RACH response message for the UE (making the UE RACH successful), or sends a short RACH backoff (making the RACH successful as soon as possible). Otherwise, the network device does not respond to the UE, or does not send Msg4 or Msg B for the UE, or sends a long RACH backoff.

If the cause value is the priority of the slicing identity of the UE or the priority of the type to which the slice of the UE belongs, the network device determines whether the service can be provided based on the preferred slicing according to the information. For example, whether the network device can support the slices corresponding to the priority, and if the slices corresponding to the priority can be supported, whether the network device can still provide these slicing services for the UE according to other factors (the maximum number of UEs supported under the slicing, etc.). If yes, the network device responds to the UE (causing the UE RACH to succeed), or sends a RACH response message for the UE (causing the UE RACH to succeed), or sends a short RACH backoff (causing the RACH to succeed as soon as possible). Otherwise, the network device does not respond to the UE, or does not send Msg 4 or Msg B for the UE, or sends a long RACH backoff.

If the cause value is the location of the UE, the network device may not respond to the UE according to the location of the UE and the type of the UE (e.g. whether the UE is a slicing-capable UE), if the UE is not a slicing-capable UE and the network to which the network device belongs is a slicing-provided network.

S5, the UE determines the RACH result according to the message sent by the network device, and executes the subsequent operation.

According to Implementation 1, based on the slicing information in the RACH process, the network device executes access control (such as whether to respond to the RACH process of the UE, whether to send Msg 4 or MsgB for the UE, whether to send long/short RACH backoff value, etc.), differentiates the UE (whether to support, priority, etc.), and ensures the priority access of the required UE.

Implementation 2

Figure 6:
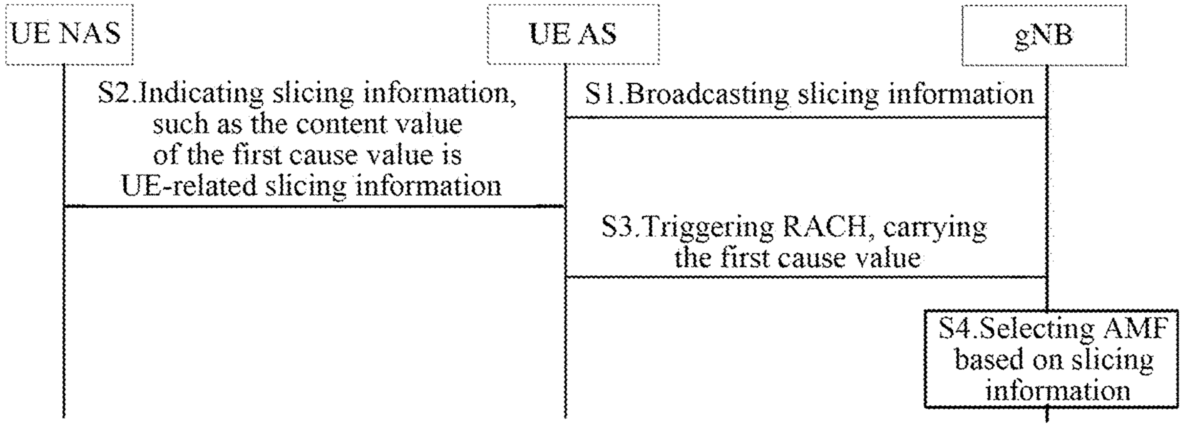
FIG. 6 is a schematic diagram of Implementation 2 according to an implementation of the present application.

The UE carries the slicing information through the RACH process. For example, Msg 3 or Msg A message in the RACH process may be used for carrying. For example, slicing information may be indicated using a first cause value carried in the RACH process. The slicing information is used by the network device to select an appropriate network function entity, for example, an AMF, an SMF UPF, to provide a service for the UE. The following is an example of the AMF as a network entity, and other network functional entities, such as SMF and UPF, may be selected accordingly to provide services for the UE, without further elaboration. The slicing information may include at least one of the following: a slicing identity of the UE, a type to which the slice of the UE belongs, a priority of the slice of the UE, a priority of the type to which the slice of the UE belongs, a location information of the UE etc. FIG. 6 is a schematic diagram of Implementation 2 according to an implementation of the present application. As shown in FIG. 6, the implementation includes:

S1, the network device broadcasts the slicing related information through the serving cell.

The slicing-related information may include at least one of the following: slicing identity (specifically, the slicing identity may include: NSSAI, S-NSSAI, NSID); slice type (including type identifier); mapping relationship between slicing identity and slicing type; priority of slicing type; priority of slicing identity.

The slicing-related information may include slices supported by the serving cell or slices not supported by the serving cell. Among them, the slice supported by the serving cell is the slice supported by the network, that is, the slice supported by the network device included in the network.

Slicing-related information can also be indicated by dedicated RRC signaling, such as RRCrelease.

S2, the UE NAS sends the indication information to the UE AS, and the indication information is the slicing information related to the UE. Wherein:

The indication information is embodied as the first cause value.

The content of the cause value is slicing information.

The slicing information may include at least one of the following: a slicing identity of the UE, a type to which the slice of the UE belongs, a priority of the slice of the UE, a priority of the type to which the slice of the UE belongs, and a location information of the UE.

S3, the UE AS triggers the RACH process and carries the slicing information related to the UE in the RACH process. Wherein:

The RACH process is 2-step RACH, 4-step RACH.

The slicing information is carried in Msg 3 or Msg A.

The slicing information is carried using the first cause value in the RACH.

The slicing information, for example, the cause value, is carried in the establishment request message, or the reestablishment request message, or the resume request message.

The cause value is the new cause value introduced in the establishmentCause, reestablishmentCause, or ResumeCause, and is used to reflect the slicing information.

The cause value content is the slicing information.

The slicing information may include at least one of the following: a slicing identity of the UE, a type to which the slice of the UE belongs, a priority of the slice of the UE, a priority of the type to which the slice of the UE belongs, a location information of the UE, and a slicing request indication. Slicing information, which may be one or more, for example, a list.

The slice of the UE in the UE slicing information may include one of the following: a requested slice, an allowed slice, and a configured slice. That is, slicing information may be embodied as slicing identity.

In addition:

when the UE determines the slicing type to which the slice of the UE belongs, it may be determined according to the relationship between the slicing and the type indicated by the cell. If the slice of the UE does not belong to the slicing in the type indicated by the cell, the UE can assign the slicing to the default type or a predetermined type.

When the UE determines that the slice of the UE does not belong to the slicing indicated by the cell, the UE can assign the slicing to the default type or a predetermined type, and can also directly report the slicing identity.

S4, the network device receives the first cause value carried in the RACH, determines the slicing information, and then selects the appropriate AMF for the UE to provide services for the UE. Here is an example.

If the cause value is the UE location, the network device determines a slice that can be provided according to the UE location. If the location has a corresponding slicing service, the AMF corresponding to the slicing is selected to provide service for the UE. Otherwise, the network chooses default or predetermined AMF.

If the cause value is the UE location, the network device preferentially selects the network function entity that does not provide slicing (such as default or predetermined AMF) according to the UE location and the UE type (such as whether the UE is a UE with slicing capability or not), if the UE is a UE without slicing capability. Otherwise, the AMF that provides slicing is selected.

If the cause value is the UE location, slicing (or type), and slicing (or type) priority, the network device determines a slicing that can be provided according to the UE location, slicing (or type), and slicing (or type) priority, and selects an appropriate AMF to preferentially select the service of the slice with high priority for the UE. Otherwise, the network device selects the default or predetermined AMF If the cause value is the UE location and the slicing request indication, the network device determines the AMF that can provide the slicing for the UE according to the information. Otherwise, the network device selects the default or predetermined AMF.

If the cause value is the slicing identity of the UE or the type to which the slice of the UE belongs, the network device determines the AMF corresponding to the slicing service can be provided for the UE according to the information. Otherwise, the network device selects the default or specific AMF.

If the cause value is the priority of the slicing identity of the UE or the type priority to which the slice of the UE belongs, the network device determines whether the service can be provided based on the slicing corresponding to the priority according to the information. For example, whether the network device can support the slices corresponding to the priority, and if the slices corresponding to the priority can be supported, whether the network device can still provide these slicing services for the UE according to other factors (the maximum number of UEs supported under the slicing, etc.). If yes, the network device selects an AMF that can provide priority slicing service for the UE. Otherwise, the network device selects a default or specific AMF.

According to Implementation 2, compared with Implementation 1, another network behavior is given, that is, based on the slicing information in the RACH process, the network device selects the appropriate AMF by distinguishing the UE (whether it is supported or not, priority, etc.), so as to ensure the service of the UE with different requirements.

It should be understood that in various implementations of the present application, sequence numbers of the various processes do not imply an order of execution of the various processes, which should be determined by their functions and internal logics, but should not constitute any limitation on implementation processes of the implementations of the present application.

The above information sending and receiving methods according to the implementations of the present application are described in detail with reference to FIG. 1 to FIG. 6. The terminal and the network device according to the implementations of the present application will be described below with reference to FIG. 7 to FIG. 9.

Figure 7:
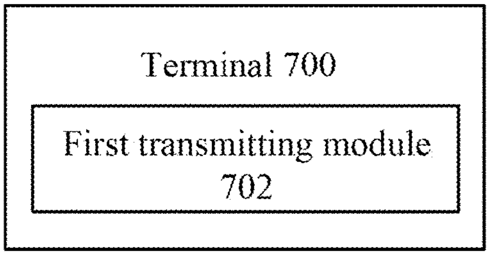
FIG. 7 is a schematic block diagram of a terminal according to an implementation of the present application.

FIG. 7 is a schematic block diagram of a terminal according to an implementation of the present application. As shown in FIG. 7, the terminal 700 includes a first sending module 702 which is described below.

The first sending module 702 is used for sending the slicing information of the terminal to the network device.

As an implementation, the first sending module is used for carrying the slicing information through the Radio Resource Control (RRC) message or the uplink message in the random access RACH process, and sending the slicing information to the network device.

As an implementation, the uplink message includes at least one of the following: message 1 in the four-step RACH process, message 3 in the four-step RACH process, and message A in the two-step RACH process.

As one implementation, the slicing information is carried by a cause value in the RRC message or in the uplink message, wherein the cause value in the RRC message is used to represent a cause for triggering the RRC message by a standard, and the cause value in the uplink message is used to represent a cause for triggering the RACH process.

As an implementation, the content of the cause value in the RRC message includes the slicing information, or the content of the cause value in the uplink message includes the slicing information.

As one implementation, the slicing information of the terminal includes at least one of: a slicing identity of the terminal, a type to which the slice of the terminal belongs, a priority of the slice of the terminal, a priority of the type to which the slice of the terminal belongs, location information of the terminal, and a preferred Public Land Mobile Network (PLMN) identifier.

As one implementation, the terminal further includes: a first receiving module, which is used for receiving the slicing indication information sent by the network device before sending the slicing information of the slice required by the terminal to the network device; and a first determining module, which is used for determining the slicing information according to the slicing indication information.

As one implementation, the slicing indication information includes at least one of the following: a slicing identity supported by network device, a slicing type supported by network device, a mapping relationship between the slicing identity and slicing type supported by network device, a priority of slicing identity supported by network device, a priority of slicing type supported by network device, an indication that the network device allows the slicing information to be reported, Public Land Mobile Network (PLMN) identifier supported by network device, mapping relationship between the slicing identity and PLMN identifier supported by network devices, a mapping relationship between slicing type and PLMN identifier supported by network devices, a threshold for the quantity of terminals defined by a slice supported by a network device, a threshold for the quantity of terminals defined by the slice supported by a PLMN, a threshold for the quantity of terminals defined by the slice supported by a session, a threshold for the quantity of sessions defined by the slice supported by a network device, and a threshold for the quantity of sessions defined by the slice supported by a PLMN.

As an implementation, the first receiving module is configured to receive the slicing indication information sent by the network device in at least one of the following ways: receiving the slicing indication information by receiving the broadcast of the network device; and the terminal receives the slicing indication information by receiving the predetermined signaling sent by the network device.

As an implementation, the first determining module being used for determining the slicing information according to the slicing indication information includes at least one of the following: the type to which the slice of the terminal belongs is determined according to the mapping relationship between the slicing identity supported by the network device and the slicing type in the slicing indication information. If it is determined that the slice of the terminal does not belong to the slicing type indicated in the slicing indication information, the slice of the terminal is assigned to a default type or a predetermined type. If it is determined that the slice of the terminal does not belong to the slice indicated in the slicing indication information, the slice of the terminal is assigned to a default type or a predetermined type; If it is determined that the slice of the terminal does not belong to the slice indicated in the slicing indication information, the slice of the terminal is assigned to a default slice or a non-slice. The terminal determines the type to which the slice of the terminal belongs according to the mapping relationship between all slicing identities of the network device and the slicing types in the slicing indication information.

As an implementation, the slicing identity of the terminal or the slicing identity supported by the network device includes at least one of: network slice selection assistance information, single network slice selection assistance information, and network slicing identity.

As an implementation, the slice of the terminal includes at least one of a requested slice, an allowed slice, a configured slice and a default slice.

As an implementation, the terminal further includes at least one of the following: a second receiving module, which is used for receiving the control result sent by the network device, wherein the control result includes: the result of the RACH process determined according to the slicing information, or the response to the RACH process triggered by the terminal; a third receiving module, which is used for receiving the selection result sent by the network device, wherein the selection result includes at least one of the following: an access and mobility management function AMF for serving the terminal selected according to the slice information, a session management function SMF for serving the terminal selected according to the slicing information, a user plane function UPF for serving the terminal selected according to the slicing information, and an indication whether a required core network entity is selected.

As an implementation, the result of the RACH process includes a successful execution of the RACH process and a failure to execute the RACH process.

It should be understood that the above and other operations and/or functions of various units in the device according to an implementation of the present application are respectively for implementing corresponding processes of the terminal in various methods in FIG. 1 to FIG. 6, and will not be repeated here for brevity.

Figure 8:
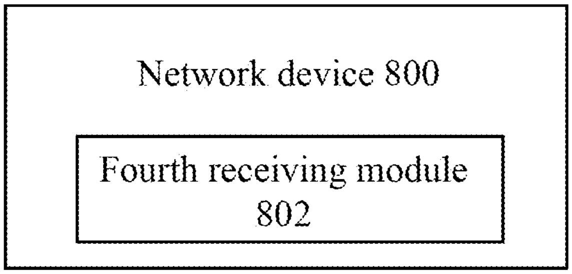
FIG. 8 is a schematic block diagram of a network device according to an implementation of the present application.

FIG. 8 is a schematic block diagram of a network device according to an implementation of the present application. As shown in FIG. 8, the network device 800 includes a fourth receiving module 802, which is described below.

The fourth receiving module is used for receiving the slicing information of the terminal sent by the terminal.

As an implementation, the fourth receiving module is used for carrying the slicing information through a Radio Resource Control (RRC) message or an uplink message in a random access RACH process, and receiving the slicing information sent by the terminal.

As an implementation, the uplink message includes at least one of the following: message 1 in the four-step RACH process, message 3 in the four-step RACH process, and message A in the two-step RACH process.

As one implementation, the slicing information is carried by a cause value in the RRC message or in the uplink message, wherein the cause value in the RRC message is used to represent a cause for triggering the RRC message by a standard, and the cause value in the uplink message is used to represent a cause for triggering the RACH process.

As an implementation, the content of the cause value in the RRC message includes the slicing information, or the content of the cause value in the uplink message includes the slicing information.

As one implementation, the slicing information of the terminal includes at least one of: a slicing identity of the terminal, a type to which the slice of the terminal belongs, a priority of the slice of the terminal, a priority of the type to which the slice of the terminal belongs, location information of the terminal, and a preferred Public Land Mobile Network (PLMN) identifier.

As one implementation, the network device further includes a second sending module, which is used for sending the slicing indication information to the terminal before receiving the slicing information of the terminal sent by the terminal.

As one implementation, the slicing indication information includes at least one of the following: a slicing identity supported by network device, slicing type supported by network devices, a mapping relationship between the slicing identity and slicing type supported by network devices, priority of slicing identity supported by network device, priority of slicing type supported by network device, an indication that the network device allows the slicing information to be reported, Public Land Mobile Network (PLMN) identifier supported by network device, mapping relationship between the slicing identity and PLMN identifier supported by network device, a mapping relationship between slicing type and PLMN identifiers supported by network device, a threshold for the quantity of terminals defined by a slice supported by a network device, a threshold for the quantity of terminals defined by the slice supported by a PLMN, a threshold for the quantity of terminals defined by the slice supported by a session, a threshold for the quantity of sessions defined by the slice supported by a network device, and a threshold for the quantity of sessions defined by the slice supported by a PLMN.

As an implementation, the second sending module is configured to send the slicing indication information to the terminal in at least one of the following ways: sending the slicing indication information to the terminal through a broadcast mode; and sending slicing indication information to the terminal by sending predetermined signaling to the terminal.

As one implementation, a slicing identity of a terminal or a slicing identity supported by a network device includes at least one of: network slicing selection assistance information, single network slicing selection assistance information, and network slicing identity.

As one implementation, the network device further includes a judging module, which is used for determining whether the slice required by the terminal can be provided for the terminal according to the slicing information and obtaining a judgment result.

As one implementation, the network device further includes a third sending module for sending the judgment result to the terminal.

As an implementation, the third sending module is used for sending a response message including the slice of the terminal that can be provided to the terminal when the judgment result of the judging module is that the slice of the terminal can be provided to the terminal.

As an implementation, the judging module is further used for, when the it is determined that the terminal meets the slicing condition according to the slicing information, the network device determines that the slice required by the terminal can be provided for the terminal.

As one implementation, the slicing conditions include at least one of the following: the slice supported by the network device matches the slice required by the terminal, the slicing type supported by the network device matches the type to which the slice required by the terminal belongs, the location of the terminal is within the range of the slicing service provided by the network device, the priority of the slices supported by the network device meets the priority of the slices required by the terminal, the slice with a predetermined priority supported by the network device matches the slice required by the terminal, the slice supported by the network device matches the slice with a predetermined priority required by the terminal, a slice with predetermined priority supported by the network device matches a slice with predetermined priority required by the terminal, a type to which a slice with a predetermined priority supported by the network device belongs matches a type to which a slice required by the terminal belongs, the type to which the slices supported by the network device belong matches the type to which the slices of the predetermined priority required by the terminal belong, the type to which the slice with predetermined priority supported by the network device belongs matches the type to which the slice with predetermined priority required by the terminal belongs, the slicing type supported by the network device meets the type to which the slice required by the terminal belongs, lower than the threshold of the quantity of terminals defined by the slices supported by the network device, lower than the threshold for the quantity of terminals defined by the slice supported by a PLMN, lower than the threshold for the quantity of terminals defined by the slice supported by a session, lower than the threshold for the quantity of sessions defined by the slice supported by a network device, and lower than the threshold for the quantity of sessions defined by the slice supported by a PLMN; the slice required by the terminal matches the predetermined slice supported by the network device, and the predetermined slice required by the terminal matches the slice supported by the network device.

As an implementation, the judging module is further used for determining whether the slice required by the terminal can be provided for the terminal according to the slicing information and obtaining a judgment result, which further includes at least one of the following: executing RACH process control on the terminal according to whether the slice required by the terminal can be provided for the terminal or not, and obtaining a control result, wherein, the control result includes: a result of the RACH process determined according to the slicing information, or a response to the RACH process triggered by the terminal; responding to the RRC request message triggered by the terminal according to whether the slice required by the terminal can be provided for the terminal; selecting at least one of the following to provide services for the terminal according to whether it can provide the terminal with the slice required by the terminal: an access and mobility management function AMF, a session management function SMF, and a user plane function UPF.

As an implementation, the result of the RACH process includes a successful execution of the RACH process and a failure to execute the RACH process.

As an implementation, the slice of the terminal includes at least one of a requested slice, an allowed slice, a configured slice and a default slice.

It should be understood that the above and other operations and/or functions of various units in the device according to an implementation of the present application are respectively for implementing corresponding processes of the network device in various methods in FIG. 1 to FIG. 6, and will not be repeated here for brevity.

Figure 9:
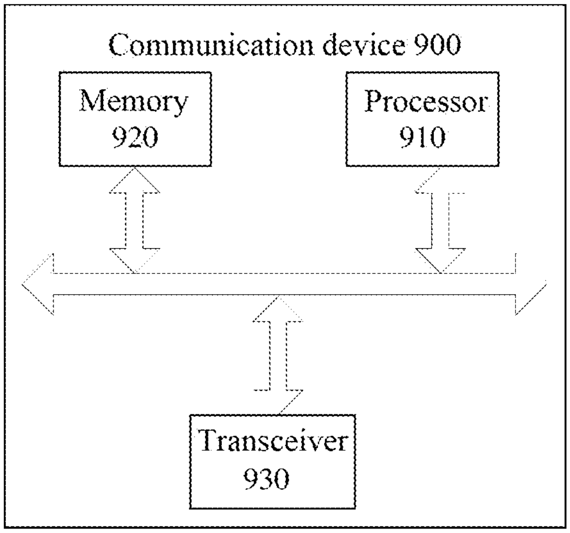
FIG. 9 is a schematic diagram of structure of a communication device according to an implementation of the present application.

FIG. 9 is a schematic diagram of structure of a communication device according to an implementation of the present application. The communication device 900 shown in FIG. 9 includes a processor 910, wherein the processor 910 may call and run a computer program from a memory to implement the method in the implementation of the present application.

Alternatively, as shown in FIG. 9, the communication device 900 may further include a memory 920. The processor 910 may invoke and run a computer program from the memory 920 to implement any of the methods in the implementations of the present application.

The memory 920 may be a separate device independent of the processor 910, or may be integrated in the processor 910.

Alternatively, as shown in FIG. 9, the communication device 900 may further include a transceiver 930, and the processor 910 may control the transceiver 930 to communicate with another device. Specifically, the transceiver 630 may send information or data to another device or receive information or data sent by another device.

The transceiver 930 may include a transmitter and a receiver. The transceiver 930 may further include antennas, a quantity of which may be one or more.

Optionally, the communication device 900 may be specifically a terminal of the implementation of the present application, and the communication device 900 may implement the corresponding processes implemented by the terminal in the various methods of the implementation of the present application, which will not be repeated here again for brevity.

Optionally, the communication device 900 may specifically be the network device according to the implementations of the present application, and the communication device 900 may implement corresponding processes implemented by the network device in various methods in the implementations of the present application, which will not be repeated here for brevity.

Figure 10:
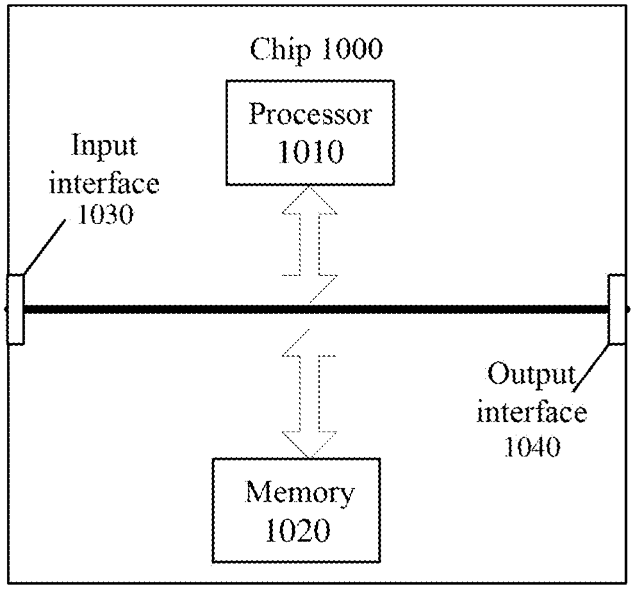
FIG. 10 is a schematic diagram of a structure of a chip according to an implementation of the present application.

FIG. 10 is a schematic diagram of a structure of a chip according to an implementation of the present application. The chip 1000 shown in FIG. 10 includes a processor 1010, wherein the processor 1010 may call and run a computer program from a memory to implement a method in an implementation of the present application.

Alternatively, as shown in FIG. 10, the chip 1000 may further include a memory 1020. The processor 1010 may invoke and run a computer program from the memory 1020 to implement any of the methods in the implementations of the present application.

The memory 1020 may be a separate device independent of the processor 1010, or may be integrated in the processor 1010.

Alternatively, the chip 1000 may further include an input interface 1030. The processor 1010 may control the input interface 1030 to communicate with another device or chip. Specifically, the processor 710 may acquire information or data sent by another device or chip.

Alternatively, the chip 1000 may further include an output interface 1040. The processor 1010 may control the output interface 1040 to communicate with another device or chip. Specifically, the processor 710 may output information or data to another device or chip.

Optionally, the chip may be applied in a terminal of the implementation of the present application, and the chip may implement the corresponding processes implemented by the terminal in the various methods of the implementation of the present application, which will not be repeated here again for brevity.

Optionally, the chip may be applied to the network device in the implementations of the present application, and the chip may implement the corresponding processes implemented by the network device in the various methods of the implementations of the present application, which will not be repeated here for brevity.

It should be understood that the chip mentioned in the implementations of the present application may also be referred to as a system-level chip, a system chip, a chip system, or a system on chip, etc.

It should be understood that the processor in the implementations of the present application may be an integrated circuit chip with a capability for processing signals. In an implementation process, various acts of the method implementations described above may be completed through an integrated logic circuit of hardware in a processor or instructions in a form of software. The above processor may be a general purpose processor, a Digital Signal Processor (DSP), an Application Specific Integrated Circuit (ASIC), a Field Programmable Gate Array (FPGA), or another programmable logic device, a discrete gate or transistor logic device, or a discrete hardware component. The processor may implement various methods, acts, and logic block diagrams disclosed in the implementations of the present application. The general purpose processor may be a microprocessor or the processor may be any conventional processor. The acts of the methods disclosed in connection with the implementations of the present application may be directly embodied by execution of a hardware decoding processor, or by execution of a combination of hardware and software modules in a decoding processor. The software modules may be located in a storage medium commonly used in the art, such as a random access memory, a flash memory, a read-only memory, a programmable read-only memory or an electrically erasable programmable memory, or a register. The storage medium is located in a memory, and a processor reads information in the memory and completes the acts of the above methods in combination with its hardware.

It should be understood that the memory in the implementations of the present application may be a transitory memory or a non-transitory memory, or may include both transitory and non-transitory memory. The non-transitory memory may be a Read-Only Memory (ROM), a Programmable ROM (PROM), an Erasable PROM (EPROM), an Electrically EPROM (EEPROM), or a flash memory. The transitory memory may be a Random Access Memory (RAM) which serves as an external cache. As an example, but not as a limitation, many forms of RAMs are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). It should be noted that the memories of the systems and methods described herein are intended to include, but are not limited to, these and any other suitable types of memories.

It should be understood that, the foregoing memories are examples for illustration but should not be construed as limitations. For example, the memory in the implementations of the present application may be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), a Direct Rambus RAM (DR RAM), etc. That is to say, the memories in the implementations of the present application are intended to include, but are not limited to, these and any other suitable types of memories.

An implementation of the present application further provides a computer readable storage medium, configured to store a computer program.

Optionally, the computer readable storage medium may be applied to the terminal in the implementations of the present application, and the computer program causes a computer to perform the corresponding processes implemented by the terminal in various methods according to the implementations of the present application, which will not be repeated here again for brevity.

Optionally, the computer readable storage medium may be applied to the network device in the implementations of the present application, and the computer program causes the computer to perform the corresponding processes implemented by the network device in various methods according to the implementations of the present application, which will not be repeated here again for brevity.

An implementation of the present application further provides a computer program product, including computer program instructions.

Optionally, the computer program product may be applied to the terminal in the implementations of the present application, and the computer program instructions cause the computer to perform the corresponding processes implemented by the terminal in various methods according to the implementations of the present application, which will not be repeated here again for brevity.

Optionally, the computer program product may be applied to the network device in the implementations of the present application, and the computer program instructions cause the computer to perform the corresponding processes implemented by the network device in various methods according to the implementations of the present application, which will not be repeated here again for brevity.

An implementation of the present application further provides a computer program.

Optionally, the computer program may be applied to the terminal in the implementations of the present application, and when the computer program is run on a computer, the computer is caused to perform the corresponding processes implemented by the terminal in various methods according to the implementations of the present application, which will not be repeated here again for brevity.

Optionally, the computer program may be applied to the network device in the implementations of the present application. When the computer program is run on a computer, the computer is enabled to perform corresponding processes implemented by the network device in various methods according to the implementations of the present application, which will not be repeated here for brevity.

Those of ordinary skills in the art will recognize that units and algorithm acts of various examples described in connection with the implementations disclosed herein may be implemented in electronic hardware, or a combination of computer software and electronic hardware. Whether these functions are implemented in a form of hardware or software depends on a specific application and a design constraint of a technical solution. Those skilled in the art may use different methods to implement the described functions for each specific application, but such implementation should not be considered to be beyond the scope of the present application.

Those skilled in the art may clearly understand that for convenience and conciseness of description, specific working processes of the systems, apparatuses, and units described above may refer to corresponding processes in the aforementioned method implementations, and details will not be repeated here.

In several implementations according to the present application, it should be understood that the disclosed systems, apparatuses, and methods may be implemented in other ways. For example, the apparatus implementations described above are only exemplary. For example, a division of the units is only a division of logical functions, but there may be other division manners in actual implementations. For example, multiple units or components may be combined or integrated into another system, or some features may be ignored or not executed. In addition, coupling or direct coupling or communication connection shown or discussed between each other, which may be indirect coupling or communication connection between the devices or units via some interfaces, may be electrical, mechanical, or in other forms.

The unit described as a separate component may or may not be physically separated, and the component shown as a unit may or may not be a physical unit, i.e., it may be located in one place, or may be distributed across multiple network units. Some or all of the units may be selected according to practical needs to achieve purposes of solutions of the implementations.

In addition, various functional units in various implementations of the present application may be integrated in one processing unit, or various units may be physically present separately, or two or more units may be integrated in one unit.

The functions may be stored in a computer readable storage medium if implemented in a form of a software functional unit and sold or used as a separate product. Based on such understanding, a technical solution of the present application, in essence, or a part contributing to the prior art, or a part of the technical solution, may be embodied in a form of a software product. The computer software product is stored in a storage medium, and includes several instructions for enabling a computer device (which may be a personal computer, a server, or a network device, or the like) to perform all or part of the acts of the methods described in various implementations of the present application. And the aforementioned storage medium includes various media, such as a U disk, a mobile hard disk, a Read-Only Memory (ROM), a Random Access Memory (RAM), a magnetic disk, or an optical disk, etc., which may store program codes.

The foregoing are merely specific implementations of the present application, but the protection scope of the present application is not limited thereto. Any person skilled in the art may readily conceive variations or substitutions within the technical scope disclosed by the present application, which should be included within the protection scope of the present application. Therefore, the protection scope of the present application shall be subject to the protection scope of the claims.

The invention claimed is:

1. A method for transmitting information, comprising:

sending, by a terminal, slicing information of a slice required by the terminal to a network device through a Radio Resource Control (RRC) message or an uplink message in a random access (RACH) process; wherein the slicing information of the slice required by the terminal comprises a slicing identity of the terminal;

receiving, by the terminal, a control result sent by the network device according to whether the network device can provide the terminal with the slice required by the terminal, wherein the control result comprises: a result of a RACH process determined according to the slicing information;

wherein the slicing information of the slice required by the terminal comprises:

a slicing identity of the terminal, a type to which a slice of the terminal belongs, a priority of a slice of the terminal, a priority of a type to which a slice of the terminal belongs, location information of the terminal, and a preferred Public Land Mobile Network (PLMN) identifier.

2. The method of claim 1, wherein the uplink message comprises message 1 in a four-step RACH process.

3. The method of claim 1, wherein the slicing identity of the terminal or the slicing identity supported by the network device comprises a network slicing identity.

4. The method of claim 1, wherein a slice of the terminal comprises at least one of a requested slice, an allowed slice, a configured slice and a default slice.

5. The method of claim 1, wherein the result of the RACH process comprises a successful execution of the RACH process and a failure to execute the RACH process.

6. A terminal, comprising:

a transmitter, which is used for sending slicing information of a slice required by the terminal to a network device through a Radio Resource Control (RRC) message or an uplink message in a random access (RACH)

process; wherein the slicing information of the slice required by the terminal comprises a slicing identity of the terminal;

a receiver, which is used for receiving a control result sent by the network device according to whether the network device can provide the terminal with the slice required by the terminal, wherein the control result comprises: a result of a RACH process determined according to the slicing information;

wherein the slicing information of the slice required by the terminal comprises:

a slicing identity of the terminal, a type to which a slice of the terminal belongs, a priority of a slice of the terminal, a priority of a type to which a slice of the terminal belongs, location information of the terminal, and a preferred Public Land Mobile Network (PLMN) identifier.

7. The terminal of claim 6, wherein the uplink message comprises message 1 in a four-step RACH process.

8. The terminal of claim 6, wherein the slicing identity of the terminal or the slicing identity supported by the network device comprises a network slicing identity.

9. The terminal of claim 6, wherein a slice of the terminal comprises at least one of a requested slice, an allowed slice, a configured slice and a default slice.

10. A network device, comprising a receiver, which is used for receiving slicing information of a slice required by a terminal sent by the terminal through a Radio Resource Control (RRC) message or an uplink message in a random access (RACH) process; wherein the slicing information of the slice required by the terminal comprises a slicing identity of the terminal;

a processor, which is used for determining whether the slice required by the terminal can be provided for the terminal according to the slicing information, and obtaining a control result;

a transmitter, which is used for sending the control result to the terminal, wherein the control result comprises: a result of a RACH process determined according to the slicing information;

wherein the slicing information of the slice required by the terminal comprises:

a slicing identity of the terminal, a type to which a slice of the terminal belongs, a priority of a slice of the terminal, a priority of a type to which a slice of the terminal belongs, location information of the terminal, and a preferred Public Land Mobile Network (PLMN) identifier.

11. The network device of claim 10, wherein the result of the RACH process comprises a successful execution of the RACH process and a failure to execute the RACH process.

* * * * *